United States Patent Office

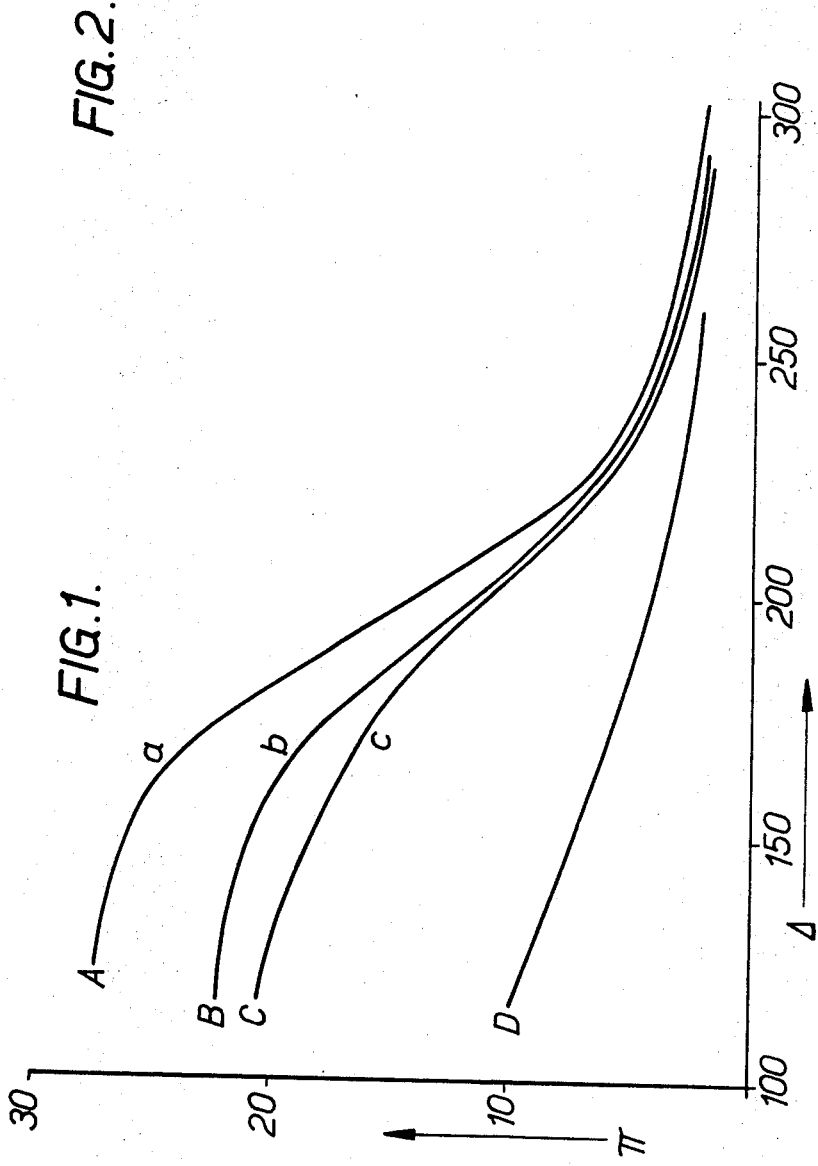

3,535,122
Patented Oct. 20, 1970

3,535,122
FROZEN DESSERTS
Peter Ronald Mussellwhite, Wallington, and Douglas Anthony Walker, Welwyn, England, assignors to Lever Brothers Company, New York, N.Y., a corporation of Maine
Filed Mar. 24, 1967, Ser. No. 625,807
Claims priority, application Great Britain, Mar. 30, 1966, 14,121/66
Int. Cl. A23g 5/00
U.S. Cl. 99—136
12 Claims

ABSTRACT OF THE DISCLOSURE

A mixture of fatty acid triglyceride oil, water, casein, and minor protein, for instance non-casein milk proteins and gelatin, is homogenised with the formation of an oil-in-water emulsion, to which further casein in at least 3% concentration is then added to increase the proportion of major to minor protein; the resulting emulsion is frozen and whipped to form a frozen dessert, especially ice cream or mousse, having improved processing, shape-retaining and eating properties.

---

This invention relates to frozen desserts containing a dispersed gas phase, and especially to ice cream and mousse, and to emulsions for their preparation.

Milk is an emulsion of fat globules in water containing in the aqueous phase proteins, notably casein, $\alpha$-lactalbumin and $\beta$-lactoglobulin, milk sugar and minerals, and it, or materials prepared from it commonlly form the basis of frozen desserts containing dispersed air, notably ice cream and mousse. Ice cream is essentially a partially frozen emulsion of a fatty acid triglyceride oil in water, in which a large amount of air is dispersed by whipping. Milk fat is commonly used as the fatty acid triglyceride oil, but it can be replaced wholly or in part by equivalent oils, for instance palm oil. Ice cream usually also contains the other solids present in milk, as well as added ingredients that confer a suitable flavour and texture. Such added ingredients include sucrose, which not only provides sweetness but also depresses the freezing point of the water and thus controls the proportion of ice crystals present at eating temperature and hence the hardness of the ice cream; stabilisers, for instance soluble polysaccharides and gelatin, which increase the viscosity of the ice cream mix and help to prevent formation of large ice crystals; and emulsifiers, for instance fatty acid monoglycerides, which control the extent to which the fat globules can flocculate. The physical structure of an ice cream is accordingly highly complex, involving both liquid and gaseous phases as well as more than one solid phase, and controls both the way in which the ice cream can be handled during its production and packaging and its behaviour or consumption.

It is standard practice to extrude the frozen ice cream at a temperature at which it is not too hard to be workable, because a proportion of unfrozen liquid is still present, so that it can be shaped as required, and to pack the extruded material and lower its temperature still further in storage. Good shape-retaining characteristics in the extruded material are important because forces applied during movement from the extruder for and during packaging can otherwise result in loss of shape. Where gelatin is used as stabiliser, this aids in shape retention but a step of ageing the mix before freezing is necessary for its stabilising properties to develop, and ageing usually requires 5 to 10 hours.

The shape-retaining behaviour of the ice cream during consumption, known as "stand-up," is also important, for the physical behaviour of the ice cream on consumption is responsible for its appeal to the consumer both in the physical sensation produced in the mouth and in the way in which flavour is released. Another property important in this respect is the "coolness" of the ice cream, which is not the temperature of the ice cream at the time of consumption, but a property which is a function of the rate at which heat is extracted from the tongue during consumption, and is dependent on the effective thermal conductivity of the ice cream: some ice creams are commonly referred to by manufacturers as "warm-eating" and others as "cold-eating," representing values of the coolness property towards opposite ends of a range of coolness. The physical sensations of consuming "warm-eating" and "cold-eating" ice creams are diffiierent, each having an appeal to the consumer.

It has hitherto been a problem to produce an ice cream having both "cold-eating" and good shape-retaining characteristics. Both the resistance to change of shape and the effective thermal conductivity of an ice cream are dependent on its physical structure. As resistance to change of shape presumably increases with increasing area of phase boundary present, while thermal conductivity presumably decreases because phase boundaries are an impediment to heat transfer, good shape-retaining properties and "cold-eating" properties have hitherto appeared to be incompatible.

Mousse is a dessert closely related to ice cream which is manufactured in a frozen state for storage and differs essentially from ice cream only by its capacity to retain its shape fully on melting of its ice content. It also has an air-cell structure, and the necessary rigidity on melting is commonly conferred by the incorporation of additional gelatin in a mix otherwise resembling that used for ice cream. The additional gelatin confers the desired rigidity but the resulting material is fairly hard.

The present invention is concerned with new formulations and procedures for making these frozen desserts which provide improved processing and eating characteristics.

Evidence which has been obtained indicates that proteins present in emulsions of the type used for making ice cream and mousse play a major part in controlling the physical structure of the products prepared from such emulsions. It is now believed that the individual fat droplets are stabilised against coalescence by a surface layer of modified protein, that the coated droplets become associated with one another in clumps because of interaction between the modified protein layers on adjacent droplets, and that the flocculation of fat droplets which results from such clumping is an important factor in achieving the desired physical structure. It has been found that the surface properties of the individual proteins present in ice cream formulations in relation to fatty acid triglyceride oil-in-water emulsions vary greatly and that the extent to which they have been made to form the interacting surface layers referred to above has hitherto depended upon the presence of other substances, especially emulsifiers such as the monoglycerides of oleic and stearic acid.

It has now been discovered that valuable properties can be conferred on aqueous emulsions of fatty acid triglyceride oils containing proteins by modifying the nature and quantity of the proteins present according to a new principle. According to this principle, two or more proteins having different surface chemistry characteristics are made to interact with one another at the interface between the fat droplets and the aqueous phase in which the droplets are dispersed, and this interaction and its consequences are controlled by the way in which the proteins are introduced at the interface. It is postulated that by such interaction one protein compels another to undergo a structural modification at the interface between the fat droplets and the aqueous phase in which the droplets are dispersed, and that the surface layers on adjacent droplets of modified protein thus formed are more capable of interaction to promote clumping.

A surface chemistry characteristic that distinguishes one type of protein from another for the purpose of this invention is its surface collapse pressure at an air-water interface as determined on a surface balance. FIG. 1 of the accompanying drawings illustrates the surface pressure exerted by various proteins introduced as monomolecular surface films on a surface balance as the area of film is reduced by compression. Surface pressure ($\pi$) measurements are given in dynes per centimetre, and each curve traces the change of surface pressure with change in area ($\Delta$). Curves A, B, C and D show the characteristics of casein, $\alpha$-lactalbumin, $\beta$-lactoglobulin and gelatin respectively. Casein shows with decreasing surface area a steepening curve representing resistance to collapse of the film, until a point $a$ is reached at a pressure of 25 dyne/cm. after which the film collapses with little increase in pressure; the collapse pressure of casein is stated as 25 dynes/cm. $\alpha$-Lactalbumin and $\beta$-lactoglobulin show similar characteristics except that they show less resistance to collapse: their collapse pressures are about 19 and about 16 dynes/cm. respectively as indicated by the points $b$ and $c$. On the other hand gelatin shows high compressibility throughout the range and no appreciable resistance to collapse: based on comparison with the range of areas at which the other proteins show resistance to collapse, gelatin can be said to exhibit a collapse pressure of less than 5 dynes/cm.

It has further been found that when certain proteins are introduced into a system where a protein of lower collapse pressure is present at an air-water or oil-water interface, the introduced protein will compete with the existing protein for position at that interface and cause some kind of surface interaction to occur. If an oil-water interface is formed by placing a layer of palm oil (a fatty acid triglyceride oil) on a water reservoir, a small amount of an aqueous solution of a protein is injected into the water, and the change in surface pressure at the interface is followed by means of a surface balance, it is found that the surface pressure increases rapidly at first, and then slowly until its value becomes constant. If a small amount of an aqueous solution of a second protein having a higher collapse pressure than that of the first is then injected into the water, changes in surface pressure at the interface are again followed, and there is observed a second rapid increase in surface pressure, the surface pressure approaching a contant value at a higher level than the first, the protein of higher collapse pressure is competing with the protein of lower collapse pressure for position at the interface.

In a system having a protein content consisting of multiple protein constituents, the protein of highest collapse pressure that is capable of competing with all or part of the remaining protein in the manner described above, and is present in significant quantity, is termed in this specification "major protein" and the remaining protein constituents of lower collapse pressure are termed "minor protein." Thus in a system where casein and $\beta$-lactoglobulin are the only proteins present, casein is major protein and $\beta$-lactoglobulin minor protein, for casein has a much higher collapse pressure than, and is capable of competing with, $\beta$-lactoglobulin as described above. Similarly, where casein and gelatin are the only proteins present, the casein is major protein and the gelatin is minor protein. In a system where the proteins present are casein, $\alpha$-lactalbumin, $\beta$-lactoglobulin and gelatin, and the casein is present in significant amount, casein is major protein and the three other proteins of lower collapse pressures are together the minor protein. In addition to casein, $\alpha$-lactalbumin and $\beta$-lactoglobulin, milk contains very small amounts of serum albumin, euglobulin and pseudoglobulin, but for practical purposes these proteins can be ignored and the non-casein protein considered as a mixture of $\alpha$-lactalbumin and $\beta$-lactoglobulin.

It is probable that where major and minor protein are adsorbed together at an oil-water interface, the major protein compels some minor protein to undergo structural modification because it exerts a higher pressure than the minor protein can withstand, and that this provides the modified flocculating properties of the emulsions with which this invention is concerned. For the two classes of protein to be adsorbed together at the interface in sufficient quantities of each to provide the modified properties it is necessary to arrange for the concentration of the minor protein to be increased in relation to the concentration of major protein at the time the interface is formed so that an increased proportion of the minor protein reaches the interface. It has also been discovered that the subsequent addition of major protein does not destroy the flocculating properties of the emulsion thus obtained.

It is possible to demonstrate that substantial amounts of two proteins providing major protein and minor protein are adsorbed together at the interface in an oil-in-water emulsion by measuring the electrophoretic mobility of oil droplets in the emulsion and making comparisons with the mobilities of droplets having the two proteins respectively adsorbed on them. Thus the mobility of droplets having adsorbed casein is markedly less than of those having adsorbed gelatin; droplets coated with both proteins have intermediate mobilities, any structurally modified minor protein constituent retaining the charge characteristics of the original protein. To show that minor protein is adsorbed at the interface in an emulsion based on milk, comparison can be made of the electrophoretic mobilities of the oil droplets of the milk modified by addition of minor protein and homogenised, and those of unmodified milk subjected to similar homogenisation. Where difficulty is found in distinguishing a difference in electrophoretic mobilities in this way because of the likeness of the proteins concerned, the emulsified droplets can be separated from the aqueous phase, the proteins adsorbed on them recovered and their characteristics examined by starch gel electrophoresis, and the proteins thus identified.

In milk emulsions used in the manufacture of ice cream and mousse, casein is effective as major protein, and the remaining milk proteins as minor protein, for $\alpha$-lactalbumin and $\beta$-lactoglobulin exhibit lower collapse pressures than that of casein, but the proportion of casein is such that little minor protein is adsorbed at the oil-water interface unless a substantial quantity of gelatin is incorporated as additional constituent of minor protein before homogenisation. The structural characteristics of ice cream and mousse made from a given milk-based formulation can, by the application of the new principle, be improved by withholding a portion of the major protein from the formulation in such a way as to increase the relative quantity of minor protein to major protein present and then forming the final adsorbed interfacial layer of protein by homogenisation to disrupt the existing interfacial protein layer in the milk, and establish new interface which then adsorbs proteins from the aqueous phase; and subsequently adding the withheld major protein to balance the formulation. Accordingly the application of the principle to the manufacture of ice cream and mousse from milk requires a deliberate departure from the established processes.

By using this new procedure it has been found possible to reduce the amount of gelatin in a formulation and yet to achieve equivalent shape-retaining properties, to obtain mousse which not only is softer and lighter in texture with more rapid flavour release because less gelatin is used, but also requires less thawing time before it become palatable, and to cut out the ageing step employed where gelatin is present. It has also been found possible to achieve good structure without using fatty acid monoglycerides or other emulsifiers, and this is advantageous not only because these emulsifiers have not yet become permitted additives to materials for human consumption in some countries, but they tend to confer "warm-eating" properties on ice cream and thus hinder the achievement of "cold-eating" properties where this is desired. By using the new procedure it is in fact possible to produce ice cream that has good shape-retaining characteristics both in production and in consumption and also "cold-eating" characteristics.

The present invention accordingly provides a process for preparing an emulsion in which a mixture of fatty acid triglyceride oil, water, and major and minor protein, the proportion of the minor protein present by weight of the major protein being at least 0.25, is homogenised with the formation of an oil-in-water emulsion having an interface at which both major and minor protein are adsorbed, and the proportion of major protein to minor protein in the homogenised mixture is then increased by dispersion in the emulsion of further major protein added in a concentration of at least 3% by weight. The emulsion thus produced is frozen and whipped to convert it to a frozen dessert containing a dispersed gas phase.

Milk fat, as whole milk, cream or butter, and other fatty acid triglyceride oils that are solid in the emulsified state at about −2° C., for instance palm oil, can be used as oils.

The constituents of the protein present will in practice be such that the major protein and a constituent of the minor protein exhibit a difference in collapse pressure of at least 5 dynes/cm., and preferably between 5 and 10 dynes/cm. Preferably casein is the major protein: preferably α-lactalbumin, β-lactoglobulin and/or gelatin are constituents of the minor protein. Other proteins can be employed, for example protein fractions obtained from soybean oil exhibiting relatively high or relatively low surface film collapse pressures at an air-water interface, can be used as, or as part of, the protein.

As the properties of the frozen dessert depend on the extent of the clumping of fat droplets that is achieved, and complete and immediate flocculation is to be avoided if the best properties are to be obtained, and as a given protein constituting major protein has a different quantitative effect on different proteins constituting minor protein, the proportion of minor protein to major protein that gives the best properties varies from protein to protein. The greater the difference between the collapse pressures of the constituents of the major protein and of the minor protein, respectively, the higher the proportion of minor protein to major protein required to give the best results. The proportion of minor protein to major protein is in practice not so high as to cause coalescence, which can be observed by separation of fat during the freezing and whipping process. For particularly good results, where milk proteins other than casein provide all the minor protein, and casein provides the major protein, the proportion of the minor protein by weight of the major protein in the mixture subjected to homogenisation should be less than 0.6, and suitably between 0.25 and 0.5. Where gelatin provides at least a substantial part of the minor protein and casein the major protein, good results can be achieved with from 0.4 to 1.6 of minor protein by weight of major protein in the mixture subjected to homogenisation.

In practice not more than 25%, and preferably from 5% to 18% by weight of fatty acid triglyceride oil is present in the emulsion that is frozen and whipped.

Preferably at least 1%, for instance from 1 to 6%, especially from 2 to 4%, by weight of protein is present in the mixture subjected to homogenisation. Preferably the major protein addition after homogenisation comprises major protein in a concentration of at least 5%, and especially from 5 to 12 to 20%, by weight, and the total protein concentration after the addition of the further major protein is greater than that in the mixture subjected to homogenisation, for instance by at least 25%, and preferably by from 50 to 100%. The total protein content in the final emulsion is preferably from 1 to 2 to 10% by weight. The further major protein addition can be as powder or as aqueous dispersion, which can include minor protein and other ingredients of the final composition.

A typical emulsion for freezing and whipping to give frozen desserts according to the invention comprises a fatty acid triglyceride oil, water, skim milk powder (the solids obtained by drying skim milk, consisting mainly of casein but with small amounts of α-lactalbumin and β-lactoglobulin, lactose and minerals) and gelatin or whey powder (consisting essentially of lactose and β-lactoglobulin.

The invention also provides a process for the preparation of a frozen dessert, especially ice cream or mousse, in which a mixture of an undispersed fatty acid triglyceride oil, water, casein and one or more of α-lactalbumin, β-lactoglobulin and gelatin, the total protein present being at least 1% of the mixture by weight, including total α-lactalbumin, β-lactoglobulin and gelatin of from 0.5 to 2.0% by weight based on the mixture, and of at least 25% by weight based on the casein present, is homogenised, and further casein in a concentration of at least 3% is added and dispersed to give an emulsion containing at least 5% by weight of fatty acid triglyceride oil, and the emulsion is frozen and whipped. Where all the protein present in the mixture subjected to homogenisation is milk protein, the proportion of the total non-casein protein present by weight of the casein present in this mixture is preferably from 0.25 to 0.5. Where casein and at least 20% of gelatin by weight of the casein are present in the mixture subjected to homogenisation, the proportion of the total non-casein protein by weight of the casein present in this mixture is preferably from 0.4 to 1.6.

In making frozen desserts formulations are, of course, employed that in addition to conforming to the requirements stated above have any additional constituents and the proportions of constituents required for the dessert recipe concerned. In putting the invention into practice, the constituents of a formulation suitable for an ice cream or mousse recipe are divided into two portions, the first of which contains the triglyceride oil, the bulk of the minor protein and a part of the casein (as major protein), and the second contains the remainder of the casein; the first portion is homogenised, and the second subsequently added and dispersed in it to give the final emulsion for freezing and whipping.

Freezing and whipping is in practice carried out as in the customary processes for making ice cream and mousse. Normally air is the dispersed gas phase, but other equivalent gases can be used, and the whipping continued until a suitable overrun, for instance 100%, is achieved.

This invention also provides a new ice cream having both good shape-retaining characteristics and "cold-eating" characteristics. Shape-retaining characteristics of an ice cream are conveniently measured by determining the hardness at −5° C. and the degree of retention of shape on thawing at 20° C., using the following tests.

CONE PENETROMETER HARDNESS TEST

This test is used for measuring hardness of ice cream immediately after extrusion at −5° C., employing a Hutchinson cone penetrometer. In this test the apex of a cone of weight 80 g. having an angle of 45° is held immediately above a plane surface of an ice cream with the conical axis vertical to the plane and the weight of the cone is released: the cone is allowed to settle into the ice cream for 5 seconds and the penetration then measured. This distance is then converted to a hardness value by means of a calibrated dial on the cone penetrometer which measures a yield value in grams per square centimetre.

SECTILOMETER HARDNESS TEST

This test is used to measure the hardness of stored ice cream and is applied to a brick (rectangular prism) of ice cream of width 4 cm. stored at −5° C. for sufficient time for the whole of the block to be at that temperature.

|  | Cone penetrometer hardness, g./cm.² | Sectilometer hardness, g. | Shape factor, h./l., percent | Overrun, percent | Coolness, ° C. | Coolness at 100% overrun |
| --- | --- | --- | --- | --- | --- | --- |
| Commercial ice creams: |  |  |  |  |  |  |
| A | 50 | 100 | 75 | 106 | 23 | 20.5 |
| B | 52 | 113 | 80 | 105 | 23 | 20.5 |
| C | 44 | 90 | 69 | 110 | 24.5 | 21.5 |
| D | 32 | 110 | 0 | 95 | 15.5 | 16.5 |
| Ice creams of examples: |  |  |  |  |  |  |
| 1 | 45 | 120 | 75 | 94 | 18 | 19 |
| 2 | 44 | 105 | 71 | 100 | 18 | 18 |
| 3 | 46 | 115 | 80 | 100 | 18 | 18 |
| 4 | 44 | 110 | 73 | 100 | 18 | 18 |
| 5 | 48 | 100 | 65 | 100 | 18 | 18 |
| 6 | 52 | 90 | 60 | 100 | 17 | 17 |

The brick is placed on end on a stand and a thin steel wire of 36 Standard Wire Gauge is placed on top across its width: the force expressed in grams weight required to draw the wire vertically down through the brick at a constant speed of 2 cm./sec. is then determined as a measure of hardness.

SHAPE RETENTION TEST

A brick (rectangular prism) of ice cream of length 14 cm., height 4 cm. and width 9 cm. which has been stored at −20° C. is placed on a gauze in an atmosphere maintained at 20° C. After 4 hours thawing the height $h$ and length $l$ of the residue are measured, and the degree of shape retention is given by the shape factor calculated as 2.50 $h/l\%$. The reproducibility of the results obtained with a given material is ±5%.

The "cold-eating" characteristics of an ice cream are measured by the following coolness test.

COOLNESS TEST

For this test a copper probe of shape shown in FIG. 2 of the accompanying drawings is used. The middle part of the probe is a conical section of length 43 mm., major diameter 8 mm., minor diameter 1.6 mm., and half angle $\theta$ whose tangent is 0.056. The probe terminates at its wide end with a cylinder of length 6 mm. and at its narrow end with a spherical section of radius 1.6 mm. and length 0.2 mm.

At the inside of the tip of the probe is soldered a differential iron-constantin thermocouple, of which the copper probe forms the hot junction, and which is connected with a cold junction provided by an ice-water mixture and a pen recorder to measure the change in temperature of the probe.

In the test the probe is heated to 37° C. and plunged into a sample of the ice cream under test which has been stored at −5° C. The figure of the temperature in ° C. recorded by the thermocouple 22 seconds after plunging is taken as a measure of the coolness of the ice cream. Thus a coolness of 20 represents a lowering of the temperature of the probe from 37° C. to 20° C., and an ice cream of coolness 17 is "colder-eating" than one of 20.

The new ice cream of this invention are those having an overrun (that is the volume of dispersed gas phase divided by the volume of ice cream) of at least 90%, and as determined by the above tests, has a sectilometer hardness of at least 80, a shape factor of at least 60%, and a coolness of less than 19. Preferably they contain at least 12% of sugar by weight. Preferably the overrun is at least 100%, the sectilometer hardness at least 90, the shape factor at least 70% and the coolness not more than 18. Preferably the cone penetrometer hardness of the ice cream is at least 35, and especially at least 40.

The following table gives a comparison of the properties of some commercial ice creams and ice creams prepared according to the invention as described in the examples below. As the coolness of an ice cream decreases with increasing overrun because the air introduced acts as a thermal insulator, and the coolness of ice cream from a given mix can be correlated with the amount of overrun, a corrected figure for coolness at 100% overrun is given where the actual overrun is more or less than 100%.

The invention also provides new mousses having an overrun of at least 70%, less than 1.2% gelatin by weight and a sectilometer hardness as determined in the above test of less than 90. Preferably the mousses have an overrun of 70 to 90% from 0.9 to 1.1% gelatin, and a sectilometer hardness of less than 80.

The following table gives a comparison of the sectilometer hardness and coolness as determined above of mousses (A) prepared using standard commercial formulations based on 1.7% gelatin content according to various flavour recipes, and mousses (B) prepared according to the same flavor recipes but with 1.0% gelatin and using the procedure employed in Example 7 below, the overrun being in each instance 80%.

|  | Sectilometer hardness, g. | Coolness, ° C. |
| --- | --- | --- |
| Chocolate: |  |  |
| A | 94 | 14 |
| B | 77 | 8 |
| Strawberry: |  |  |
| A | 72 | 12 |
| B | 61 | 10 |
| Orange: |  |  |
| A | 80 | 14 |
| B | 65 | 10 |

The invention is illustrated by the following examples, in which temperatures are in ° C. and all parts are parts by weight.

Example 1

This describes the preparation of an ice cream based on butter as the source of fatty acid glyceride oil, spray-dried skim milk powder as the source of casein as major protein and gelatin as the main part of the minor protein. The milk powder used contained the following ingredients:

|  | Parts percent |
| --- | --- |
| Casein | 30 |
| α-Lactalbumin | 3.4 |
| β-Lactoglobulin | 3.6 |
| Lactose | 52.8 |
| Milk fat | 0.7 |
| Minerals | 7.5 |
| Water | 2 |

Spray-dried milk powder (4.7 parts) was added to water (28.3 parts) in a stainless steel vessel at room temperature with vigorous stirring, and when addition was complete the mixture was diluted with further water (28.3 parts). Sucrose (22.0 parts) and unsalted butter (15.8 parts, containing 15% water) were then added while the stirred mixture was heated to 65°, and after reaching this temperature gelatin (0.94 part) was added.

The resulting emulsion contained 13.4% of triglyceride oil and 2.7% of total protein, of which 1.4% was major protein and 1.3% minor protein, giving a proportion of minor protein to major protein of 0.9. The emulsion was pumped to a homogeniser at a feed rate of 190 litres/hr. and homogenised at a pressure of 140 kg./cm.$^2$, pasteurised in a plate heat exchanger at 85° for 25 seconds and then cooled to 7°.

Additional milk powder (14.0 parts) was added to water (21.0 parts) in a stainless steel vessel at room temperature with vigorous stirring, and when addition was complete the mixture was diluted with further water (21.0 parts), and heated to 60°; it was then pumped through a plate heat exchanger at 85° for 25 seconds to effect pasteurisation and cooled to 9°.

The emulsion (100 parts) and the milk powder dispersion (56 parts, containing 7.5% by weight of casein, and therefore of major protein) were cooled to 4° and mixed in a blender by stirring, and the final mixture thus produced contained 8.6% of triglyceride oil and 5.1% of total protein, of which 3.6% was major protein and 1.5% minor protein, giving a proportion of minor protein to major protein of 0.41. The mixture, without ageing, was converted to ice cream by freezing and whipping to an overrun of 94%.

The resulting ice cream had a shape factor of 75%, a cone penetrometer hardness of 45, a sectilometer hardness of 120 and a coolness of 18.

Example 2

An unpasteurised emulsion was prepared and homogenised as in Example 1, but using roller dried skim mik (4.7 parts) instead of the spray-dried skim milk powder, its ingredients being the same.

An unpasteurised dispersion of the roller dried milk powder (14.0 parts) in water (42.0 parts) at 63° was also prepared as described in Example 1. This dispersion (56 parts, containing 7.5% by weight of casein) and the emulsion (100 parts) were mixed in a blender by stirring, pasteurised in a plate heat exchanger at 85° for 25 seconds, cooled to 4°, and then frozen and whipped to an overrun of 100%.

The resulting ice cream had a shape factor of 71%, a cone penetrometer hardness of 44, a sectilometer hardness of 105, and a coolness of 18.

Example 3

An emulsion was prepared using butter as the source of some of the fat and whole milk as the source of the remainder and the casein as major protein, with gelatin acting as the main part of the minor protein.

The emulsion was prepared as in Example 1 but using the following ingredients:

|  | Parts |
|---|---|
| Whole milk | 44.6 |
| Consisting of— |  |
| Fat (3.7%) | 1.65 |
| Casein (2.5%) | 1.12 |
| α-Lactalbumin (0.3%) | 0.13 |
| β-Lactoglobulin (0.3%) | 0.13 |
| Lactose (4.9%) | 2.2 |
| Minerals (0.7%) | 0.3 |
| Water (87.6%) | 39.1 |
| Sucrose | 32.1 |
| Unsalted butter (containing 15% water) | 21.9 |
| Gelatin | 1.4 |

The milk, sucrose and butter were mixed and heated to 66°, the gelatin then incorporated, and the mixture homogenised at 140 kg./cm.$^2$ pressure. The resulting emulsion contained 20.2% of triglyceride oil and 2.8% of total protein, of which 1.1% was major protein and 1.7% minor protein, giving a proportion of minor protein to major protein of 1.5.

A dispersion of the spray-dried skim milk powder of Example 1 (13.65 parts) in the same whole milk (11.20 parts) was prepared with heating to 65°. This dispersion (24.85 parts, containing 17.6% by weight of casein, and therefore of major protein) and the emulsion were mixed in a blender by stirring, pasteurised at 85° for 25 seconds and cooled to 4° to give a final mix containing 16.7% of triglyceride oil and 7.0% of total protein, of which 4.4% was major protein and 2.6 minor protein, the proportion of minor to major protein being 0.6. This was then frozen and whipped to an overrun of 100%.

The resulting ice cream had a cone penetrometer hardness of 46, a sectilometer hardness of 115, a shape factor of 80%, and a coolness of 18.

Example 4

An emulsion was prepared as in Example 3, but using the following ingredients:

|  | Parts |
|---|---|
| Whole milk (as in Example 3) | 39.80 |
| Spray-dried skim milk powder (as in Example 1) | 2.15 |
| Unsalted butter (containing 15% water) | 12.50 |
| Sucrose | 14.00 |
| Gelatin | 0.60 |

The resulting emulsion contained 17.5% of triglyceride oil and 3.8% of total protein, of which 2.4% was major protein and 1.4% minor protein, giving a proportion of minor protein to major protein of 0.6.

A dispersion of the spray-dried milk powder (4 parts by weight) in whole milk (26.95 parts by weight), was prepared, as in Example 3, and this dispersion (30.95 parts, containing 6.05% by weight of casein, and therefore of major protein) was mixed with the emulsion (69.05 parts by weight), the mixture pasteurised and cooled to 4° to give a final mix containing 13.1% of triglyceride oil and 4.9% of total protein, of which 3.5% was major protein, 1.4% minor protein, the proportion of minor to major protein being 0.4: the blend was frozen and whipped to give an ice cream with an overrun of 100%.

The resulting ice cream had a cone penetrometer hardness of 44, a sectilometer hardness of 110, a shape factor of 73 and a coolness of 18.

Example 5

An emulsion was prepared as described in Example 1, except that whey powder, consisting of lactose (75.5%), β-lactoglobulin (13.1%), minerals (8.6%) and water (2.8%), was employed as additional source of minor protein, and the following ingredients were used:

|  | Parts |
|---|---|
| Unsalted butter (containing 15% water) | 11.8 |
| Spray-dried skim milk powder | 5 |
| Whey powder | 2 |
| Sucrose | 14 |
| Polysaccharide gum stabiliser | 0.16 |
| Colour and flavour | 0.2 |
| Water | 53.7 |

The mixture was homogenised at a pressure of 140 kg./cm.$^2$ to give an emulsion containing 12.0% of triglyceride oil and 2.4% of total protein, of which 1.7% was major protein and 0.7% minor protein, the proportion of minor protein to major protein being 0.4.

The emulsion was mixed with a dispersion of spray-dried skim milk powder (5 parts) in water (10 parts) (the dispersion containing 10% by weight of casein and therefore of major protein) and the mixture pasteurised at 85° for 25 seconds, and cooled to give an emulsion containing 9.9% of triglyceride oil and 4.0% total protein, 3.0% being major protein and 1.0% minor protein, and the proportion of minor to major protein 0.3. The final mix was frozen and whipped to an overrun of 100%.

The resulting ice cream had a sectilometer hardness of 100, a coolness of 18, and a shape factor of 65%.

Example 6

An emulsion was prepared as in Example 5, except that 7.5 parts of spray-dried milk powder was used. The emulsion was mixed with a dispersion of spray-dried milk powder (2.5 parts) in water (10 parts) (the dispersion containing 6% by weight of casein) and the mixture converted into an ice cream as in Example 5. The resulting ice cream had a sectilometer hardness of 90, a coolness of 17, and a shape factor of 60%.

Example 7

An emulsion was prepared as in Example 1, but using the following ingredients:

|  | Parts |
|---|---|
| Palm oil | 7.0 |
| Spray-dried milk powder | 4.0 |
| Sucrose | 6.0 |
| Aqueous glucose solution of 43° Bé | 10.0 |
| Salt | 0.03 |
| Sodium citrate | 0.03 |
| Gelatin | 1.0 |
| Chocolate flavouring | 3.0 |
| Water | 50.5 |

The mixture was homogenised at a pressure of 140 kg./cm.² to give an emulsion containing 8.6% of triglyceride oil and 3.0% of total protein, consisting of 1.5% major protein and 1.5% minor protein, the proportion of minor to major protein being 1.0.

The emulsion was mixed with a dispersion of spray-dried milk powder (4.4 parts) and sucrose (2.0 parts) in water (12.0 parts) (the dispersion containing 7.2% by weight of casein, and therefore of major protein), and the mixture pasteurised at 85° for 25 seconds and cooled to 20° to give a final mix containing 7.1% of triglyceride oil and 4.1% of total protein, consisting of 2.5% major protein and 1.6% minor protein, the proportion of minor to major protein being 0.6. The mix was frozen to —4° and whipped to 80% overrun, giving a chocolate mousse having an ice cream-like texture at —5° to —10°, with a softer, lighter texture and greater degree of coolness than normal mousse and a much more rapid flavour release, while retaining excellent structural stability at ambient temperatures.

We claim:
1. A process for the preparation of an edible emulsion capable of being frozen and whipped to form a frozen dessert comprising the steps of:
 (i) mixing together a fatty acid triglyceride oil, water, casein, and a minor protein selected from the group consisting of alpha-lactalbumin, beta-lactoglobulin, gelatin, soy protein fractions, and mixtures thereof, to form a mixture, the total of the percentages of said casein and said minor protein by weight of said mixture being at least 1%, the percentage of said minor protein being from about 0.5% to about 2.0% by weight of said mixture and being at least 25% of the percentage of said casein, said fatty acid triglyceride oil being not more than about 25% by weight of said mixture,
 (ii) homogenizing said mixture,
 (iii) incorporating in said mixture subsequent to homogenization additional casein in the proportion of at least 3% by weight of said mixture, to provide an emulsion containing at least about 5% by weight of said fatty acid triglyceride oil, and
 (iv) then dispersing said additional casein in said emulsion.
2. A process for the preparation of a frozen dessert comprising:
 (i) mixing together a fatty acid triglyercide oil, water, casein, and a non-casein protein selected from the group consisting of alpha-lactalbumin, beta-lactoglobulin, gelatin, and combinations thereof to form a mixture, the total of the percentages of said casein and said non-casein protein by weight of said mixture being at least 1%, the percentage of said non-casein protein being from about 0.5% to about 2.0% by weight of said mixture and being at least 25% of the percentage of said casein, said triglyceride oil being not more than about 25% by weight of said mixture,
 (ii) homogenizing said mixture,
 (iii) incorporating in said mixture subsequent to homogenization additional casein in the proportion of at least 3% by weight of said mixture, to provide an emulsion containing at least about 5% by weight of said fatty acid triglyceride oil, and
 (iv) freezing and whipping said emulsion.
3. A process according to claim 1, wherein the proportion of additional protein added subsequent to the homogenizing step is from about 5% to about 20% by weight.
4. A process according to claim 1, wherein the proportion of the fatty acid triglyceride oil added is sufficient to provide from about 5% to about 18% of the oil by weight, whole composition basis.
5. A process according to claim 1, wherein said minor protein comprises a mixture of alpha-lactalbumin, beta-lactoglobulin, and gelatin.
6. A process according to claim 1, wherein the fatty acid triglyceride oil is milk fat.
7. A process according to claim 1, wherein said minor protein includes gelatin in the amount of at least 20% by weight of the casein, and the ratio of said minor protein to said casein in the mixture subjected to homogenization is from about 0.4 to about 1.6.
8. A process according to claim 1, wherein said minor protein is gelatin in the proportion of at least 20% by weight of said casein in the mixture subjected to homogenization.
9. A process according to claim 1, wherein the proportion of the total of said casein and said minor protein added prior to homogenizing is from about 1% to about 6% by weight of said mixture.
10. A process according to claim 1, wherein said additional casein is added to said mixture as an aqueous dispersion having at least about 3% casein therein.
11. A process according to claim 2, wherein milk protein is the sole source of said casein and said non-casein protein in the mixture subjected to homogenization.
12. A process according to claim 2, wherein said non-casein protein is gelatin in the proportion of at least 20% by weight of said casein in the mixture subjected to homogenization.

References Cited

UNITED STATES PATENTS 1,878,127   9/1932   Gray _____ 99—136

RAYMOND N. JONES, Primary Examiner

J. M. HUNTER, Assistant Examiner

U.S. Cl. X.R.

99—19, 20

UNITED STATES PATENT OFFICE
CERTIFICATE OF CORRECTION

Patent No. 3,535,122   Dated October 20, 1970

Inventor(s) Peter Ronald Mussellwhite & Douglas Anthony Walker

It is certified that error appears in the above-identified patent and that said Letters Patent are hereby corrected as shown below:

Column 1, line 32, "commonlly" should read --commonly--.

Column 4, line 72, "become" should read --becomes--.

Column 6, line 1, "100%" should read --200%--.

Column 7, line 63, "cream" should read --creams--.

Column 8, in the first Table, under the column headed (Coolness at 100% overrun) - example 5 "$1_8$" should read --18-- example 6 "$1_7$" should read --17--.

Column 9, line 29 (Example 2) "mik" should read --milk powder--.

SIGNED AND SEALED
JAN 19 1971

JAN. 19, 1971

(SEAL)
Attest:

Edward M. Fletcher, Jr.
Attesting Officer

WILLIAM E. SCHUYLER, JR.
Commissioner of Patents